United States Patent [19]

Husted

[11] Patent Number: 5,041,253
[45] Date of Patent: Aug. 20, 1991

[54] METHOD OF MAKING A PLASTIC STABILIZED COMPOSITE CAMSHAFT

[76] Inventor: Royce H. Husted, 711 Lakeside Dr., Wheaton, Ill. 60187

[21] Appl. No.: 546,735

[22] Filed: Jul. 2, 1990

Related U.S. Application Data

[63] Continuation-in-part of Ser. No. 331,492, Mar. 31, 1989, Pat. No. 4,977,793, which is a continuation-in-part of Ser. No. 208,382, Jun. 17, 1988, abandoned, which is a continuation-in-part of Ser. No. 103,843, Oct. 1, 1987, abandoned.

[51] Int. Cl.$^5$ .............................................. B28B 5/00
[52] U.S. Cl. .................... 264/251; 264/262; 29/460; 29/888.1; 74/567; 164/98; 164/112
[58] Field of Search .................. 74/567, 568 R; 123/90.6, 90.17; 403/267, 268, 269, 359, 381; 29/460, 888.1; 164/98, 112; 264/230, 262, 251

[56] References Cited

U.S. PATENT DOCUMENTS 2,884,661  5/1959  Hurley ............................... 264/251

FOREIGN PATENT DOCUMENTS

| 119112 | 9/1984 | European Pat. Off. | 74/567 |
| 53-17816 | 2/1978 | Japan | 74/567 |
| 57-149655 | 9/1982 | Japan | 74/567 |
| 1115093 | 5/1968 | United Kingdom | 74/567 |
| 2133104 | 7/1984 | United Kingdom | 74/567 |
| 2172088 | 9/1986 | United Kingdom | 74/567 |
| 8902997 | 4/1989 | World Int. Prop. O. | 74/567 |

Primary Examiner—Rodney M. Lindsey
Attorney, Agent, or Firm—Nicholas A. Camasto

[57] ABSTRACT

A method of manufacturing a composite camshaft having a shaft positioned within appropriately aligned and fixtured annular cam and bearing elements, each having interior protrusions that increase in size toward the tube axis. The shaft and elements are supported in a mold and a flowable, hardenable material is injected to fill the space between the tube and the elements for securing the elements to the shaft. The protrusions enhance the grip of the plastic with shrinkage. The shaft and the cam elements have nesting configurations that form a continuous space therebetween such that the hardened material compressionally resists torsional forces between the shaft and cam elements. Injection molding is performed without substantially stressing the freely supported shaft and without applying undue strain to the elements by providing undercut portions in the mold surrounding part of the exterior surface of the elements with high pressure plastic during injection.

14 Claims, 6 Drawing Sheets

METHOD OF MAKING A PLASTIC STABILIZED COMPOSITE CAMSHAFT

BACKGROUND OF THE INVENTION AND PRIOR ART

This application is a continuation-in-part of application Ser. No. 331,492, filed 3/31/89, now U.S. Pat. No. 4,977,793, issued Dec. 12, 1990, which is a continuation-in-part of application Ser. No. 208,382, filed June 17, 1988 (abandoned), which is a continuation-in-part of application Serial No. 103,843, filed Oct. 1, 1987 (abandoned).

This invention relates generally to shaft mounted cam elements and particularly to the method of manufacturing composite camshafts that are used in internal combustion engines.

Camshafts for internal combustion engines are well-known. A camshaft comprises an elongate cylindrical shaft having one or more bearing surfaces and one or more angularly positioned cam elements precisely located along the length thereof. The angular positioning is with respect to the centerline of the bearing surfaces of the cylindrical shaft. The cam elements control the opening and closing of the intake and exhaust valves of the internal combustion engine in the appropriate sequence as the camshaft rotates. Camshafts are manufactured by forging or casting. They are then subjected to a number of very exacting and extensive machining operations to grind and polish the circular bearing surfaces and the oval-shaped cam element surfaces. Conventional camshafts are quite massive and contribute significantly to the weight of an automobile engine.

Recently, the automotive industry has devoted a great deal of effort to improve vehicle gasoline mileage, that is the number of miles a vehicle can travel for each gallon of fuel consumed. In an effort to reduce weight, engines have been downsized and redesigned to use a lesser amount of material as well as to incorporate lighter weight materials. A feature that is growing in popularity, because of its reduced weight and higher efficiency, is the overhead camshaft. An overhead camshaft is supported above the cylinder head (outside of the engine block) and is driven in timed relationship with the engine crankshaft by means of gears and a timing belt. Its use obviates the need for push rods and rocker arms. One drawback is that an overhead camshaft generally makes a lot more noise than a conventional in-the-block camshaft.

There is also great impetus to achieve more power and efficiency from an engine. Newer designs often incorporate two intake valves per cylinder to assist in getting sufficient air/fuel mixture into the cylinder. Such engines require two camshafts and emphasize the desirability for lighter and more economical camshafts. The prior art has addressed this problem in a couple of ways.

Camshafts have been proposed that use a hollow cylindrical tube as a shaft member with the individual cam elements being separately fabricated and either brazed or welded in position along the hollow tube. Because of the thermal expansions experienced by the separate elements, camshafts made in this manner still require extensive grinding operations. Therefore, while the weight of the finished camshaft is reduced, its cost is not significantly impacted. Another technique involves positioning performed cam elements, with apertures therein for reception of a shaft, in a support fixture. The fixture holds the performed metal cam elements in appropriate positions and a hollow camshaft is inserted through the apertures. High pressure is applied to the inside of the hollow camshaft to bulge it out where permitted, i.e., where it passes through the cam elements. This action locks the cam elements to the shaft in a press fit. Here again, the resulting camshaft is lighter in weight, but the forces involved still necessitate extensive grinding of the camshaft before it can be used.

Other suggested approaches to camshaft manufacturing involve various techniques such as mechanically securing performed cam lobes or cam elements to a shaft, injecting plastic material between the cam lobes and shaft for securing the elements and a combination of mechanical attachment and plastic injection. Such techniques have apparently not been commercialized. Thus there still exists a need in the art for a lightweight, low cost, readily manufacturable camshaft.

OBJECTS OF THE INVENTION

A principal object of the invention is to provide a novel method of manufacturing a camshaft.

Another object of the invention is to provide a method of manufacturing a camshaft that is lightweight, strong and economical.

A further object of the invention is to provide a novel method of manufacturing a camshaft using high pressure plastic injection.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENTS

Figure 1:
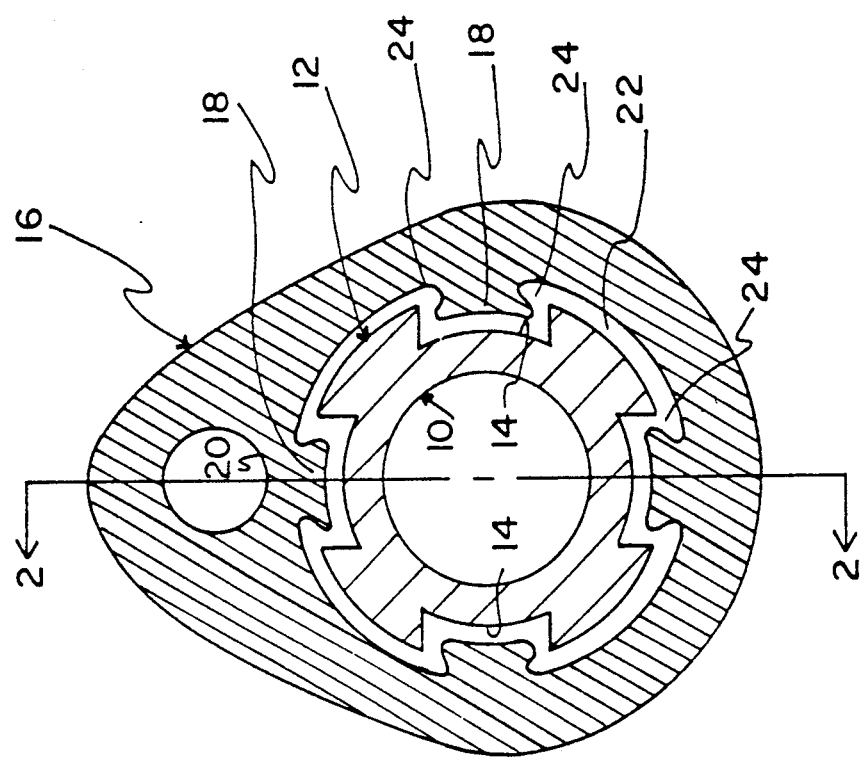
FIG. 1 is a cross section through a camshaft and cam lobe constructed in accordance with the invention in Ser. No 331,492.

Prior art camshafts include a plurality of eccentric or oval-shaped cam elements interspersed with cylindrical bearing surfaces on an elongated, solid cylindrical shaft. Such a camshaft, when constructed in accordance with prior art techniques, is either forged or cast and thereafter subjected to extensive and costly grinding operations for polishing and finishing the cam lobe and bearing surfaces to the required degree of precision.

A composite camshaft has a plastic fill material, e.g., a flowable, hardenable material that binds the cam elements to the shaft proper. In this connection, the term plastic is used to denote a characteristic of a material and not as the name of any particular material. Thus metals are plastic when molten so as to be flowable. The technique of molding on a mass production basis, utilizing side acting shuttles for positioning parts, is well-known. The preferred technique for constructing a plastic, stabilized composite camshaft with a hollow tube shaft and performed cam and bearing elements is to provide a mold having a parting line that accommodates the various cam elements in their precise angular displacements with respect to the tube and to include individual side acting shuttles for automatically feeding the cam elements into their respective positions. Similarly, the tubular shaft is inserted in the mold and through the fixtured cam elements when the shuttles have completed their operations and the mold is closed. After closure of the mold, the hardenable, plastic material is injected into suitable entry ports to fill all cavities for rigidly affixing the individual cam elements in their precise positions, and with proper angular orientations with respect to the tube, upon hardening of the material. When that occurs, the mold is opened and the finished camshaft is removed.

While a hollow tube type shaft has obvious advantages from a weight standpoint, the invention contemplates the use of solid axles or shaft members as well. The mold is gated to inject the plastic, hardenable material adjacent the cam elements. The cam elements and axle may be fabricated of heat treated steel, or the cam elements may be made of cast or powdered metal that is appropriately treated and finished. The exact dimensions of the cam elements and hollow tube will depend upon the intended use of the camshaft.

In the presently preferred embodiments of the invention for large engine applications, the cam elements are precast of powdered metal and the shaft or tube is drawn and has a fluted or ribbed exterior. The cam elements are cast with oversized interior openings that correspond generally to the cross sectional configuration of the shaft to permit a relatively small interface therebetween for the flowable hardenable plastic stabilizing material. It will be readily seen by those skilled in the art that it is desirable to arrange the flutes or ribs on the shaft to place the interface of plastic hardenable material in compression, rather than in shear, when the camshaft is in operation. It will also be appreciated that the plastic material is hot when injected and experiences shrinkage as it cools and hardens. As will be seen, the interior of the cam elements is configured to cause the plastic to increase the grip on the cam element as the material shrinks.

A recently prototyped composite camshaft design is illustrated in FIG. 1. Hollow shaft 10 has an external configuration of four symmetrically disposed flutes or ribs 12 separated by valleys 14. Cam element 16 has an interior configuration of spaced protrusions 18 that partially nest or interlock with flutes 12 and valleys 14. A hole 20 lightens the cam element and improves the flow of plastic material during injection. A sm 11 contiguous space 22 exists between the exterior configuration of shaft 10 and the interior configuration of cam element 16. The space 22 is continuous and ideally is kept small to reduce the effect of shrinkage of the plastic material. As mentioned previously, the interlocking of the shaft and cam element results in the plastic material compressionally resisting torsional loading.

Figure 2:
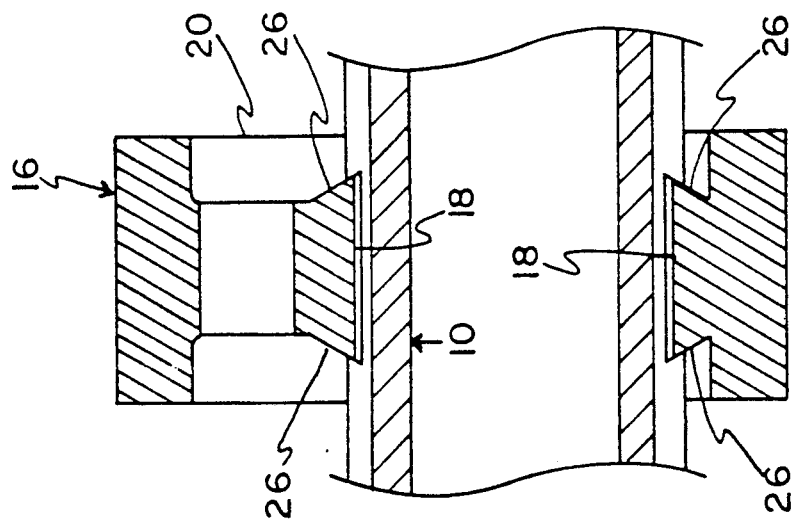
FIG. 2 is a sectional view taken along the line 2—2 of FIG. 1.

Protrusions 18 have a profile with outwardly tapered edge surfaces 24 (also 26 as seen in FIG. 2). The taper is such that plastic material shrinkage will increase the force exerted on the protrusion and thus tighten the grip on cam element 16. This is an important aspect of the camshaft since material shrinkage is always encountered, especially with the types of materials suitable for automotive engine applications.

Figure 3:
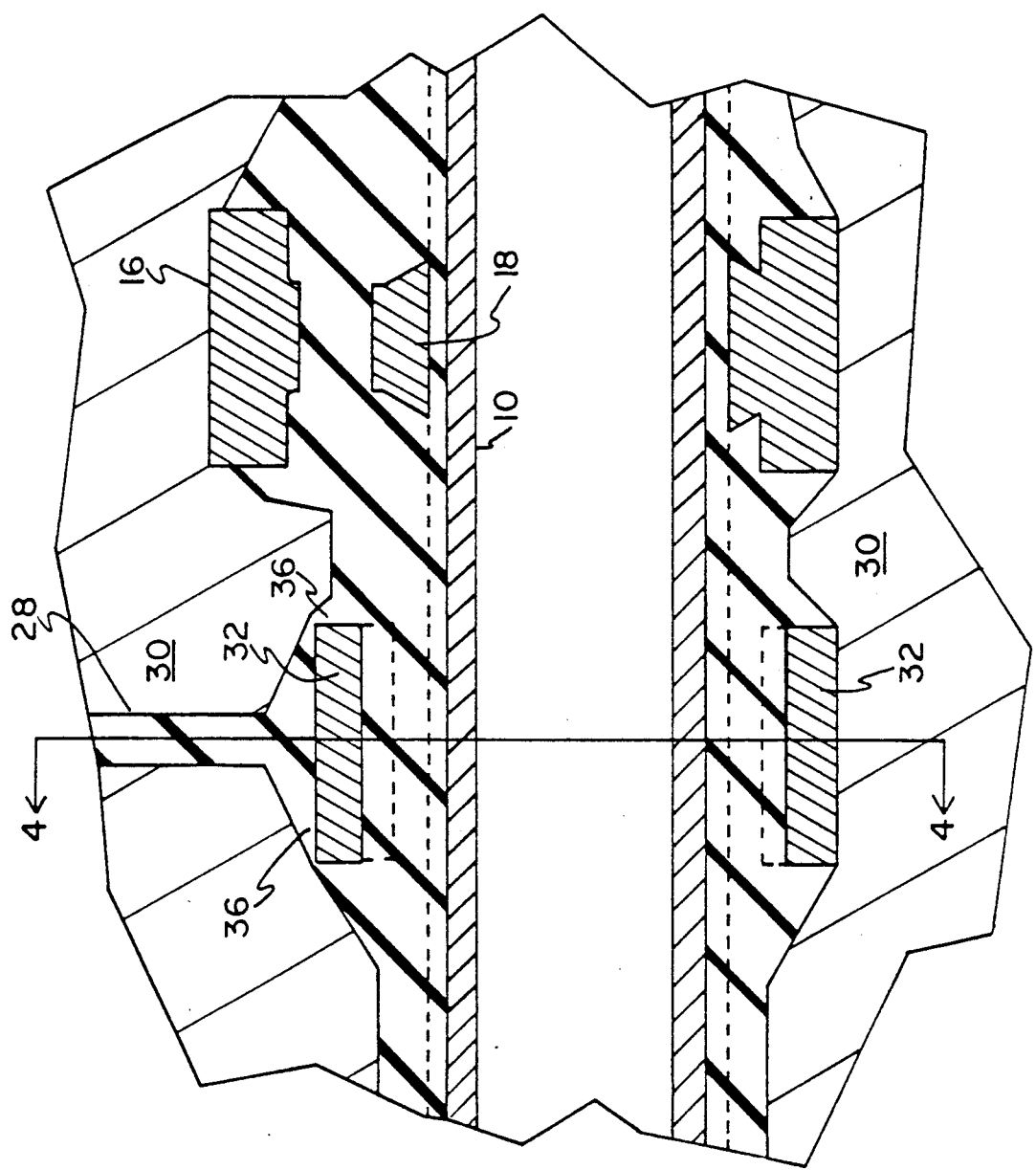
FIG. 3 is a view illustrating a method of making a composite camshaft.
Figure 4:
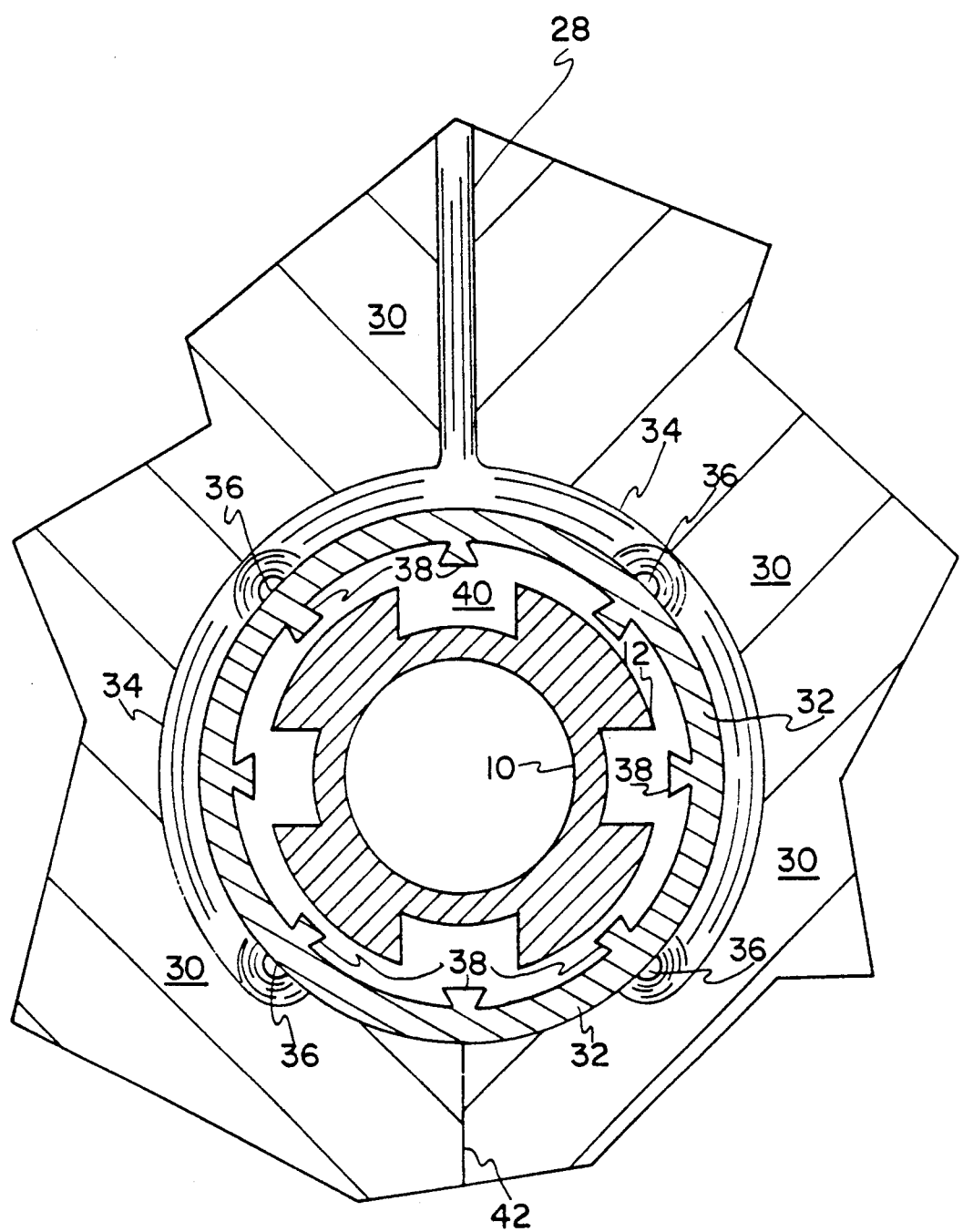
FIG. 4 is a view taken along line 4—4 of FIG. 3.

In FIGS. 3 and 4, another important aspect of the invention is shown. It has been found that the high pressure injection of plastic material into the mold that fixtures the cam elements, bearing elements and shaft has a tendency to stress the shaft, which is freely supported (at its ends) in the mold cavity. After hardening of the plastic material and removal of the finished camshaft from the mold, unacceptable runout of the bearing surfaces may occur as the stresses that may have been induced in the shaft during the injection process are relieved. In this aspect of the invention, the shaft is subjected to minimum forces that would upset its freely supported attitude by injecting the material against a solidly held surface, preferably a bearing surface, and forcing the material to simultaneously flow around the shaft to preclude any significant unbalance in forces applied to the shaft that would induce stresses therein. As illustrated in FIG. 3, a runner 28 that carries the plastic material under high pressure is formed in the mating sections of the mold 30. Runner 28 opens to undercut portions around the surface of bearing elements 32 that are solidly supported by mold 30 about the majority of their surfaces. The only surface portions that are not so supported are those adjacent to the undercut portions 34 (FIG. 4) and the gate areas 36 that permit the plastic material to flow into the spaces between the cam and bearing elements and mold surfaces and the shaft.

As best seen in FIG. 4, which is a cross sectional view of the shaft and mold taken through a bearing element 32, runner 28 divides into undercut portions 34 that encircle bearing element 32 and inject plastic material at approximately equally spaced portions around the circumferences of bearing elements 32 through gates 36. The result is that high pressure injection of plastic material into mold 30 may occur without subjecting shaft 10 to unbalanced lateral forces that might otherwise result in bending and stressing the shaft. Bearing element 32 also includes a number of inwardly directed protrusions 38 having profiles that are designed to cause the shrinking plastic material to increase the grip on the bearing element. The space 40 between the shaft exterior configuration and bearing interior configuration is desirably made larger to permit more rapid and unobstructed flow of the plastic material. No interlocking or nesting of the bearing element protrusions 38 and the shaft flutes 12 is incorporated since there are no torsional forces between the bearing element and shaft.

When the two halves of mold 30 are separated (along parting line 42) the hardened plastic in runner 28 and undercut portions 34 may readily be broken away from the camshaft, since it does not adhere to the surfaces of bearing elements 32. As shown, the plastic is injected around bearing element 32 at four gate points 36 that are ninety degrees apart.

Figure 5:
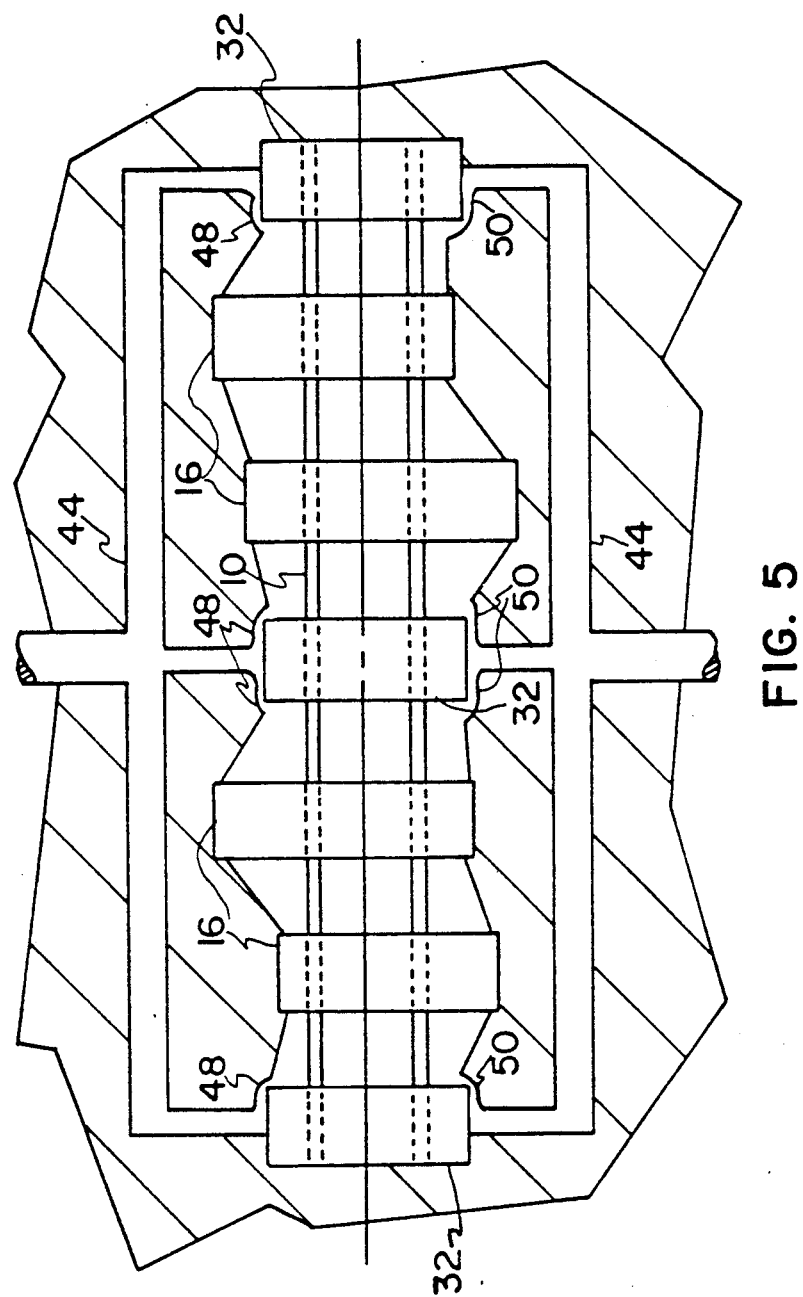
FIG. 5 is a view illustrating another technique for manufacturing a composite camshaft.

In FIG. 5, another technique for injecting the plastic material into the mold without disturbing the freely supported shaft is shown. Here multiple sprues 44 are supplied in parallel to inject the plastic about bearing elements 32 and into the interior of the mold via gates 48 and 50. Injection occurs at displaced points along the shaft 10 to assist in uniform and rapid filling of the mold cavity. Other techniques for rapidly and uniformly injecting high pressure plastic without laterally stressing the freely supported shaft 10, will occur to those skilled in the art.

Figure 6:
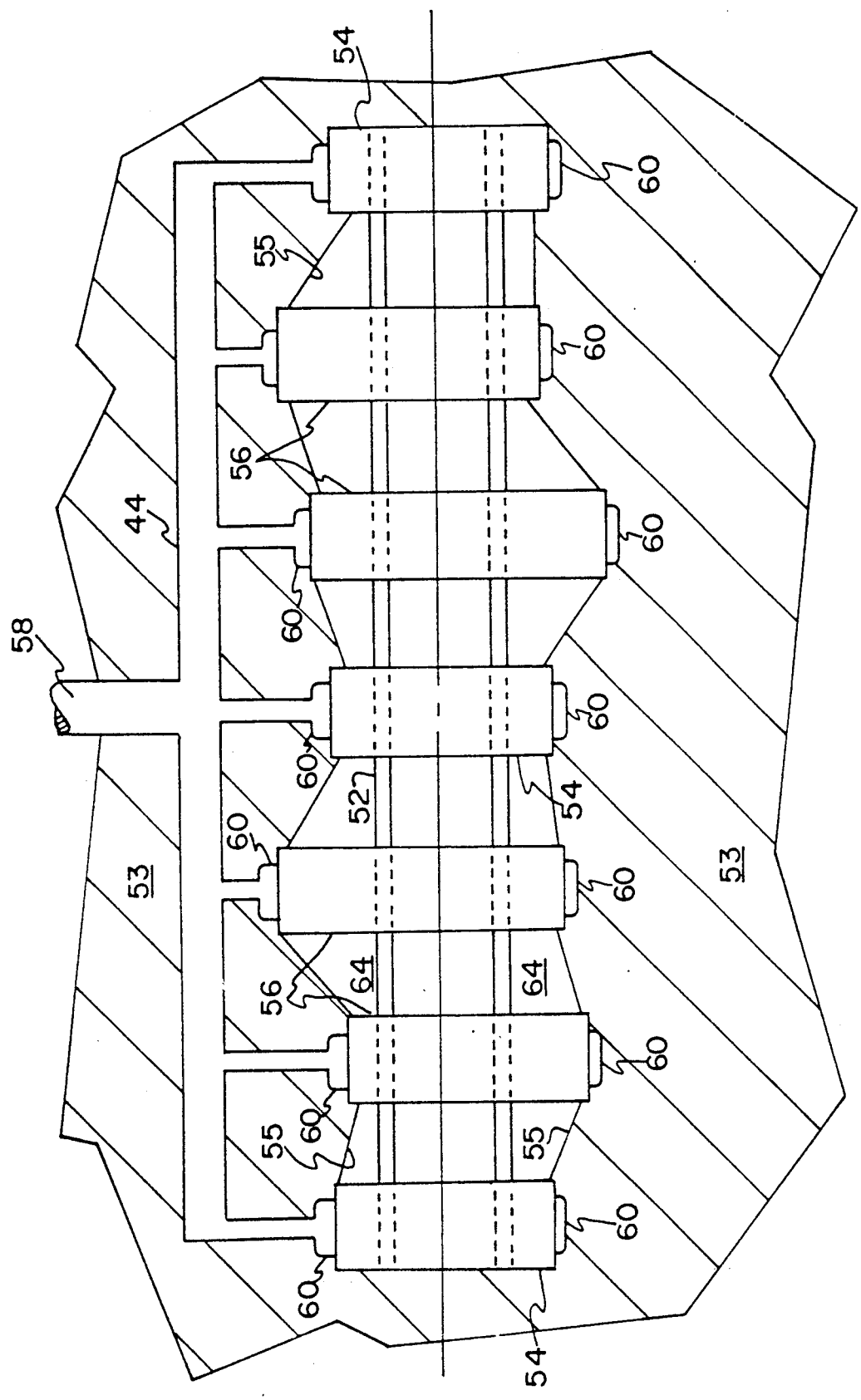
FIG. 6 is a view illustrating a preferred method of manufacturing a composite camshaft.

FIG. 6 illustrates an important aspect of the inventive method that enables very high injection molding pressure to be used without fear of cracking the powdered metal cam lobes that these lobes are generally very brittle because of the hardening processes used in their manufacture. Essentially, the mold is undercut around each of the bearing and cam elements over a portion of the surface (about 50% is shown) to permit the plastic material to offset and neutralize the internal pressure on the elements from the injected material. Under ideal conditions, the mold would completely and intimately engage the surface of the elements and resist such pressure. In practice this condition is difficult and expensive to achieve, because of the powdered metal lobes that are hard to keep within close tolerances. Using the inventive undercut method, many composite camshafts have been fabricated by high pressure injection molding without lobe cracking. Indeed pressures much higher than normal have been used without overstressing the lobes.

Mold 53 defines an inner periphery 55 that houses bearing elements 54, shaft 52 and cam lobes 56 in proper orientation. A sprue 58 is coupled by individual runners to undercut portions 60 that encircle the outer surfaces of each of the bearing elements 54 and cam lobes 56. The undercut portions cover approximately one-half of the bearing element and cam lobe surfaces, although this is a matter of design choice. The actual support provided by the mold may be reduced significantly with this technique. The spaces between the interior periphery 55 of mold 53 and the shaft 52 are filled via undercuts (not visible in FIG. 6) across the faces of the bearing elements 54, which are supplied from the associated ones of undercuts 60. These are located at ninety degrees to the plane of the figure and are shown in FIG. 7.

Figure 7:
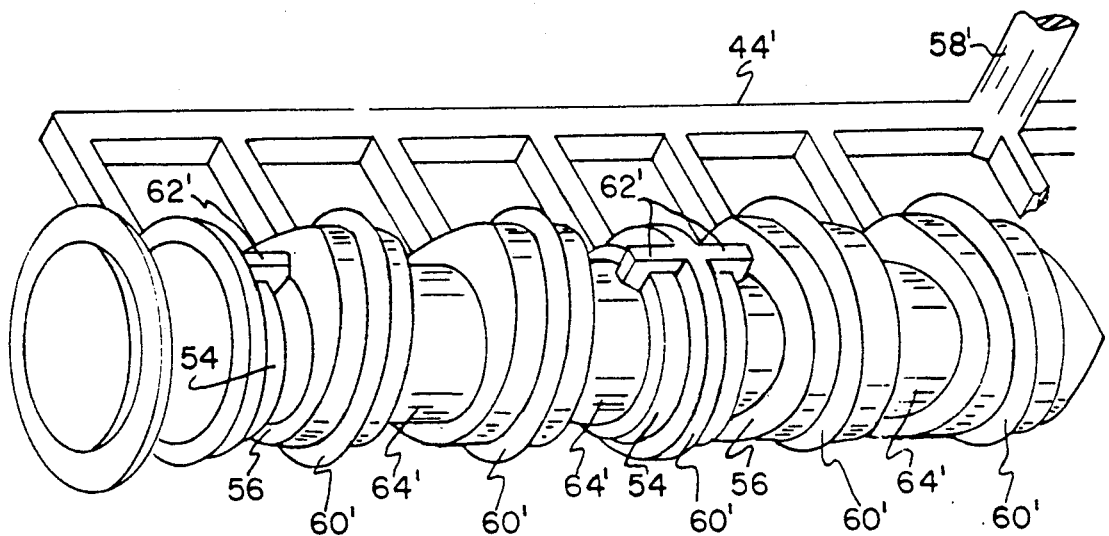
FIG. 7 is a partial view of a composite camshaft as it is removed from the mold.

FIG. 7 illustrates a portion of a composite camshaft as it appears when removed from the mold. The hardened plastic left in the sprue 58, the runners 44 and the undercuts 60 are clearly shown as elements 58', 44', 60' and 62'. The portions of plastic 60' encircle their respective bearing elements 54 and cam lobes 56. The portions of plastic 62' are seen to be at right angles to portions 60' associated with the bearing elements and adjacent to the exposed plastic 64' between the bearing and cam elements. The surface plastic portions 6040 and 62' are readily broken away since they do not adhere to the surfaces of the bearing elements 54 or cam lobes 56. All of the broken away plastic material is salvageable. The inventive method also contemplates injecting the plastic against one or more cam elements for filling the mold as is illustrated with respect to the bearing elements. In that event, undercuts across the faces of the cam elements would be included in the mold.

Figure 8:
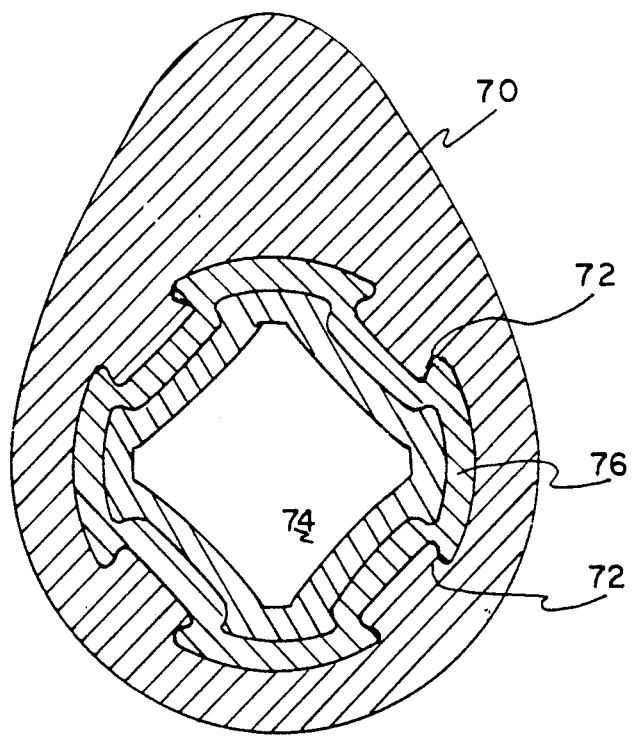
FIG. 8 is a cross section of a further refined lobe and shaft of a composite camshaft.

In FIG. 8, a cam element 70 has interior protrusions 72 that taper outwardly for grip enhancement as discussed above. The shaft is drawn into the shape illustrated and the space 76 between the shaft 74 and the cam element 70 is filled with the hardenable plastic.

It will be appreciated that, depending upon the environment, one or more of the various forms and aspects of the invention may be used with benefit, and that numerous changes in the described embodiments of the invention will be apparent to those skilled in the art without departing from its true spirit and scope. The invention is to be limited only as defined in the claims.

What is claimed is:

1. The method of fabricating a camshaft comprising the steps of:
    freely supporting a shaft member in position within a plurality of longitudinally spaced and supported cam elements and bearing elements, each of said cam elements and said bearing elements having an interior configuration forming a continuous space around said shaft member;
    injecting, under high pressure, a flowable, hardenable material against and around said elements and into the spaces between said shaft member and said elements without substantially stressing said shaft member for securing said elements in position relative to said shaft member;
    providing an openable mold having an interior configuration for supporting said elements and said shaft member in a predetermined orientation; and
    providing undercuts in said mold surrounding the exteriors of said elements and arranged to be filled with said flowable material.

2. The method of claim 1 wherein said undercuts are provided around the majority of the surface areas of said bearing elements and said cam elements and wherein said flowable, hardenable material is injected into said undercuts to offset forces on said bearing elements and cam elements.

3. The method of fabricating a camshaft comprising the steps of:
    freely supporting a shaft member in position within a plurality of longitudinally spaced and supported cam elements and a bearing element, each said element having an interior configuration forming a continuous space around said shaft member; and
    injecting, under high pressure, a flowable, hardenable material against and around one of said elements to cause flow from a number of displaced points into the spaces between said shaft member and said one element without substantially stressing said shaft member for securing said bearing element and said cam elements in position relative to said shaft member.

4. The method of claim 3 wherein said shaft member is formed of drawn metal and wherein said cam elements are formed of cast powdered metal.

5. The method of claim 4 wherein said shaft member has an outer configuration and wherein said cam elements each have the same shape and each have a common interior configuration that nests with said outer configuration to form said continuous space between said shaft member and said cam element to permit said cam elements to occupy different angular positions with respect to said shaft member, said interior and exterior configurations being such that hardened material in said space compressionally resists torsional loading between said cam elements and said shaft member.

6. The method of fabricating a camshaft comprising the steps of:
    supporting a shaft member in position within a supported element having an interior configured to form a continuous space around said shaft member;
    injecting, under high pressure, a flowable, hardenable material against and around the periphery of said element and into the space between said shaft member and the interior of said element to offset the forces on said element by said high pressure material.

7. The method of claim 6 wherein a plurality of said elements are arranged along said shaft member and wherein each of said elements has the force of said high pressure material offset.

8. The method of claim 7 wherein a mold is provided for securing said elements in proper position relative to said shaft member; and wherein said mold is undercut around said elements to provide passageway for said injected material.

9. The method of claim 8 wherein said elements comprise bearings and cam lobes.

10. The method of fabricating a camshaft including a shaft ad a plurality of cam elements supported thereon comprising the steps of:

providing an openable mold having an interior configuration for supporting said annular cam elements and said shaft in a predetermined orientation;

providing undercuts in said mold surrounding the exterior of said annular cam elements;

freely supporting the shaft in position with respect to said annular cam elements each including interior grip enhancing means;

providing, on said shaft, means for interlocking portions of said annular cam elements with said shaft such that a continuous space is formed between said annular cam elements and said shaft; and filling said space and said undercuts with a hardenable, flowable plastic material without significantly disturbing said freely supported shaft or subjecting said annular cam elements to excessive stress.

11. The method of fabricating a camshaft comprising the steps of:

freely supporting a shaft in position with respect to a supported annular element including interior grip enhancing means; and securing said element in position on said shaft by;

injecting a flowable, hardenable material under high pressure against said supported element for filling a void between said shaft and said annular element from a number of positions around said annular element to engage said grip enhancing means with said flowable, hardenable material under high pressure without significantly disturbing said freely supported position of said shaft.

12. The method of claim 11 wherein an openable mold cavity is provided for accurately supporting said annular element when closed and further including the steps of:

inserting said shaft in said mold; and injecting under high pressure said flowable, hardenable material from said number of positions substantially uniformly about said shaft to fill the void between said shaft and said annular element.

13. The method of claim 12 wherein said mold is undercut about the periphery of said annular element to permit said material to flow into said void from said number of positions.

14. The method of claim 13 wherein said undercut extends around the periphery of said element for offsetting the forces on said element from injection of said high pressure material.

* * * * *

UNITED STATES PATENT AND TRADEMARK OFFICE
CERTIFICATE OF CORRECTION

PATENT NO. : 5,041,253
DATED : August 20, 1991
INVENTOR(S) : Royce H. Husted

It is certified that error appears in the above-identified patent and that said Letters Patent is hereby corrected as shown below:

Column 3, line 55, delete "sm 11", insert --small--;

Column 5, line 47, delete "6040", insert --60'--;

Column 7, line 11, delete "ad", insert --and--.

Signed and Sealed this

Twenty-third Day of March, 1993

Attest:

STEPHEN G. KUNIN

Attesting Officer

Acting Commissioner of Patents and Trademarks